P. J. NAGLE.
EGG CARRIER OR BOX.
APPLICATION FILED MAY 24, 1913.
1,131,728.
Patented Mar. 16, 1915.
3 SHEETS—SHEET 1.
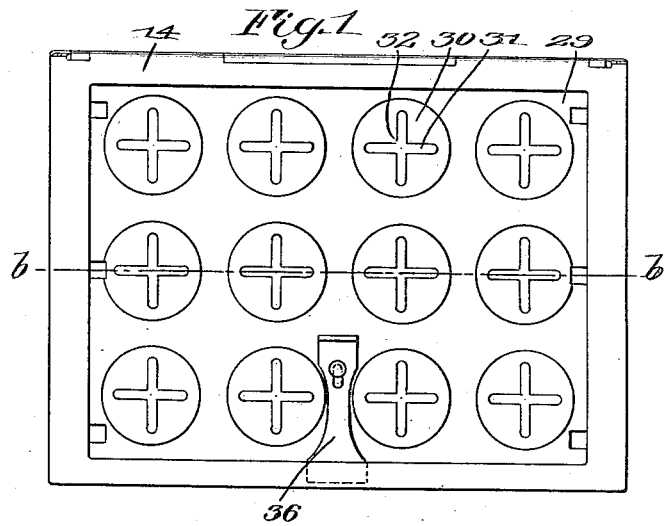
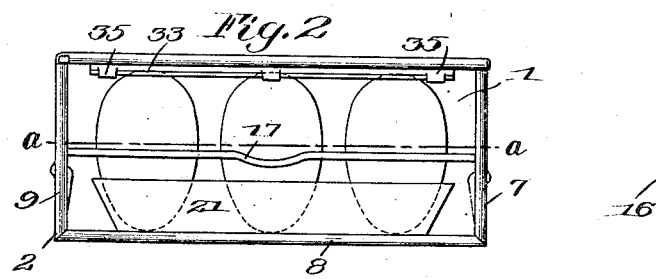
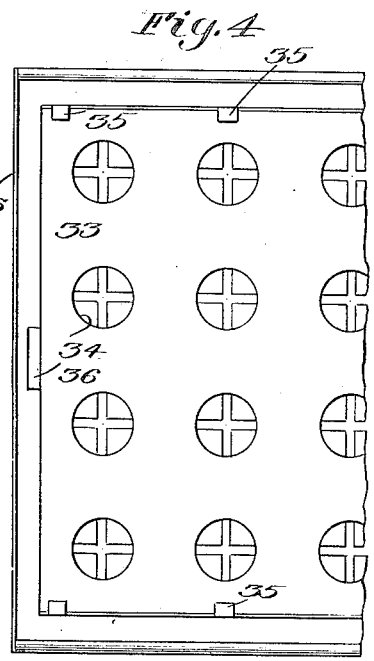
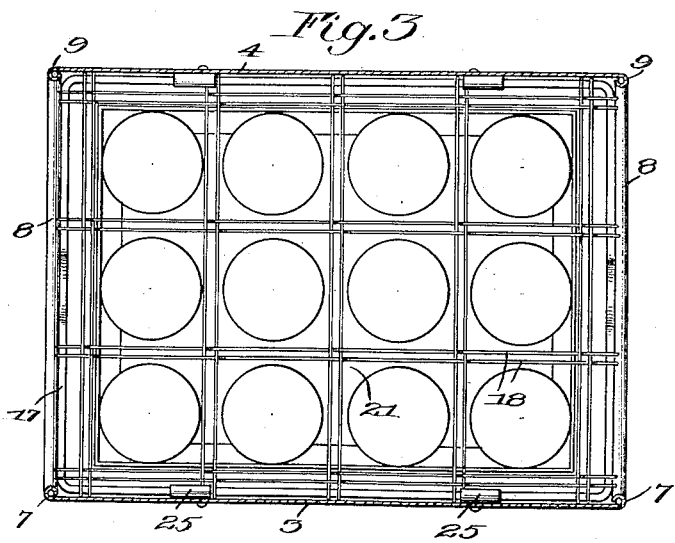

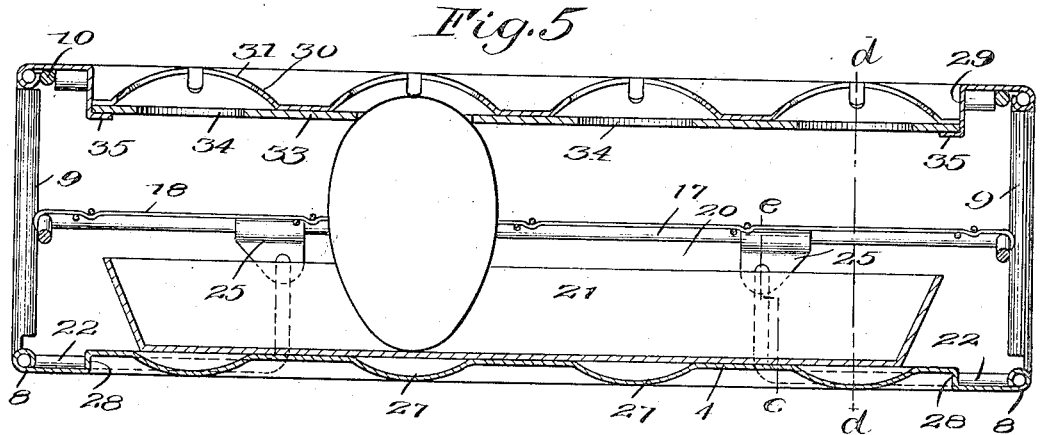
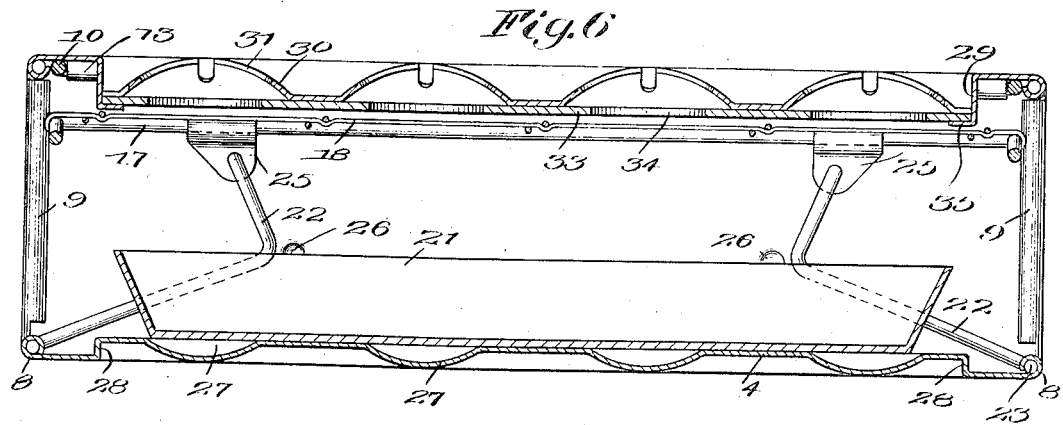
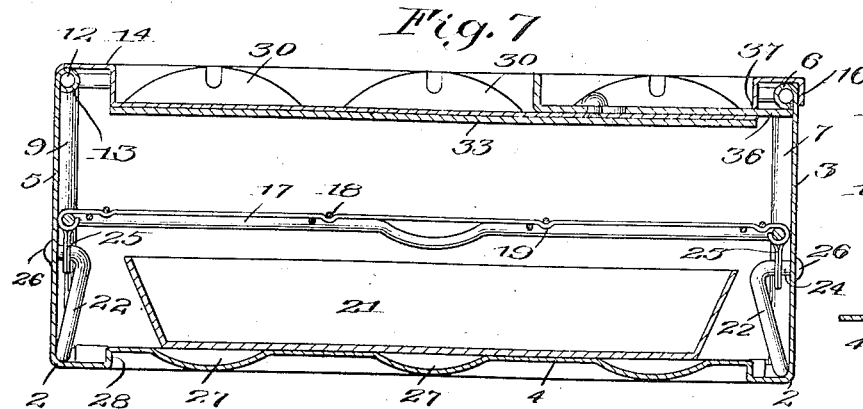
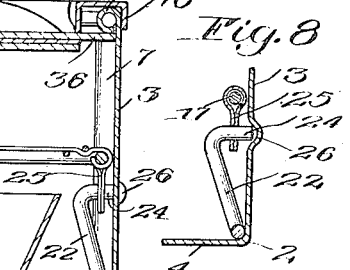
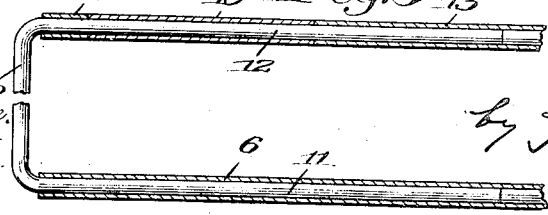

P. J. NAGLE.
EGG CARRIER OR BOX.
APPLICATION FILED MAY 24, 1913.

1,131,728.

Patented Mar. 16, 1915.

3 SHEETS—SHEET 3.

Witnesses
Ada M. Whitmore
Frances Jacubowitz

Inventor
Peter J. Nagle
By H. H. Simms
His Attorney

UNITED STATES PATENT OFFICE.

PETER J. NAGLE, OF ROCHESTER, NEW YORK.

EGG CARRIER OR BOX.

1,131,728. Specification of Letters Patent. Patented Mar. 16, 1915.

Application filed May 24, 1913. Serial No. 769,689.

*To all whom it may concern:*

Be it known that I, PETER J. NAGLE, of Rochester, in the county of Monroe and State of New York, have invented a new and useful Improvement in Egg Carriers or Boxes, which improvement is fully set forth in the following specification and shown in the accompanying drawings.

The present invention relates to egg boxes or carriers and an object of the same is to provide a device of this class which will effectively hold eggs in a separated condition, will be sanitary in every respect and will permit the same to be placed in refrigerators without injury to the parts thereof.

Another object of the invention is to provide an egg box or carrier which is so constructed that it may be utilized by grocers or other dealers for the purpose of delivering eggs in a cheap throwaway receptacle, the method of carrying the eggs in the carrier and discharging them being novel.

A still further object of the invention is to provide an improved receptacle or tray for carrying eggs.

To these and other ends the invention consists in certain parts and combinations of parts all of which will be hereinafter described, the novel features being pointed out in the appended claims.

Figure 10:
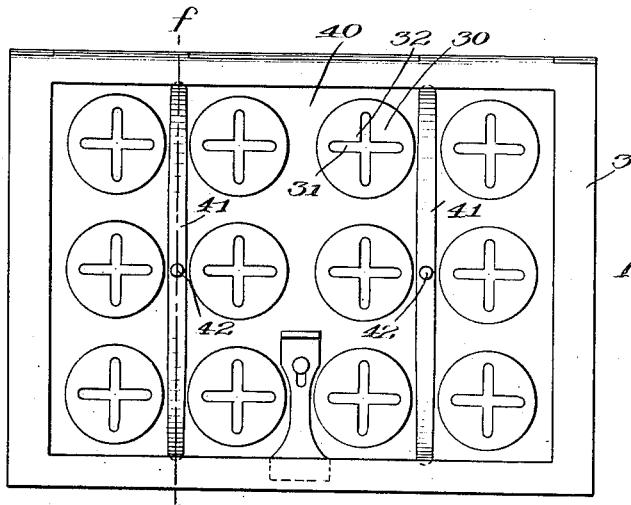
Figure 11:
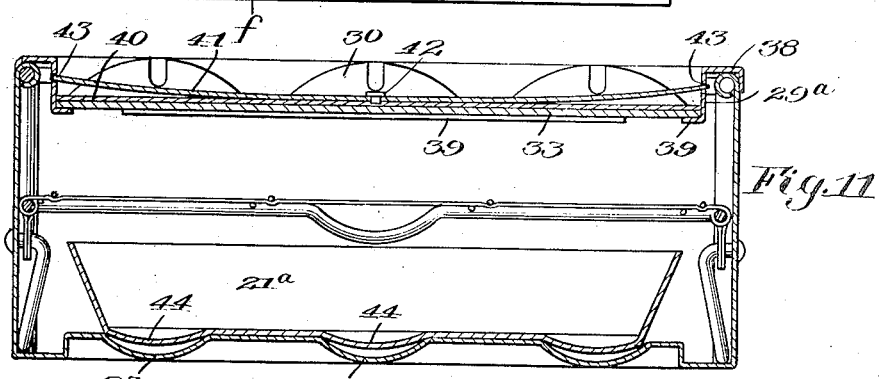
Figure 13:
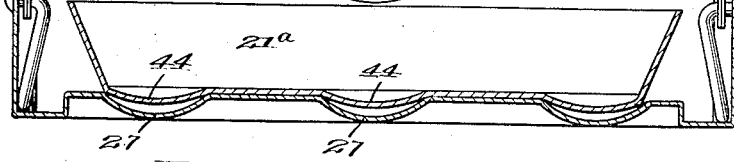
Figure 12:
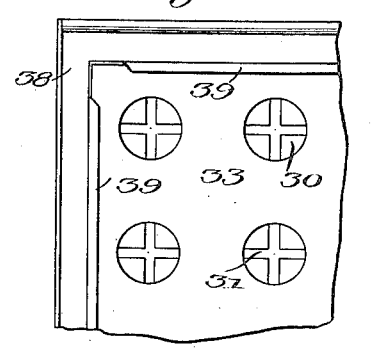

In the drawings: Figure 1 is a plan view of an egg box embodying the present improvements; Fig. 2 is an end view of the box; Fig. 3 is a section on the line *a—a*, Fig. 2; Fig. 4 is a view of the inside face of the cover or closure of the box or carrier; Fig. 5 is a section on the line *b—b*, Fig. 1, showing the position of an egg within the box or carrier; Fig. 6 is a view similar to Fig. 5 showing the separator moved to permit the withdrawal of the delivering receptacle or tray; Fig. 7 is a section on the line *d—d*, Fig. 5; Fig. 8 is a detail sectional view on the line *e—e*, Fig. 5; Fig. 9 is a detail view illustrating the manner of connecting the upper portions of the front and the rear wall of the box or carrier; Fig. 10 is a top view of another carrier embodying the present improvements; Fig. 11 is a section on the line *f—f*, Fig. 10; Fig. 12 is a detail view of the under face of the top; and Fig. 13 is a plan view of a tray or receptacle which may be used with either casing, but is herein being illustrated in the structure shown in Figs. 10 to 11 inclusive.

According to the embodiment of the invention illustrated in Figs. 1 to 9, there is employed a casing which may be of any suitable construction, but, in this instance, it is provided with discharge openings 1 in its opposite end side walls and is formed of a single blank of sheet metal bent at 2 to provide a front wall 3, a bottom wall 4 and a rear side wall 5. The upper edge of the front wall is provided with a bead or roll 6 and the side edges of the front wall are provided with beads or rolls 7. The side edges of the bottom wall are provided with beads or rolls 8 while the side edges of the rear wall are provided with beads or rolls 9.

In order to tie the front and the rear walls of the casing together while providing openings in the end side walls, there is employed a pair of tie pieces 10 between the opposite ends of the upper portions of the front and rear side walls. These tie pieces are each preferably in the form of a U-shaped member, one arm 11 of which extends into the roll 6 and the other arm 12 of which extends into rolled portions 13 at the upper edge of the rear side wall.

A cover of any suitable construction may be employed for the casing. Preferably such cover is in the form of a member 14 hinged to the rear wall of the casing and, to this end, is provided with rolled portions 15 which lie between the rolled portions 13 on the rear wall and are held in such position by the arms 12 of the connecting members 10, said arms thus serving as hinge pintles as will be seen more clearly by referring to Fig. 9 of the drawing. The front portion of the cover is provided with a downwardly-turned flange 16 which fits over and coöperates with the outer face of the front wall 3 of the casing when the cover is in closed position.

With the object in view of holding the eggs separated from each other, there may be employed, in connection with the casing, a separator. This separator may be of any suitable material or construction. In the present instance, it embodies a rectangular frame 17 made of wire stock and having separating means supported by the same. This separating means may be in the form of crossed wires 18 anchored at their ends on the sides of the rectangular frame and arranged in pairs. At the points of crossing of two pairs, one member of each pair passes above one member of the other pair and below the other member of such pair, crimps being formed at 19 to permit this positioning of the strands and serving to prevent lateral shifting of the crossed wires relatively to each other. It is apparent that eggs in adjacent cells will rest against different wires and a jar or movement of one egg will not be transmitted to the adjacent eggs.

The separator is preferably so supported as to provide a space 20 below the same for the reception of a receptacle 21. This receptacle is preferably a cheap throwaway tray made from paper or paper board and having flaring flanges in order that a number of such trays may be nested for the purpose of reducing the cost of shipment. During the carrying of the eggs to the place of delivery, such eggs rest at their lower ends within the delivery receptacle and when the eggs are to be delivered, this receptacle is moved or withdrawn laterally from the casing through one of the openings 1 in the side walls.

As the eggs are held by the separator, it is desirable to mount the latter with relation to the bottom of the casing so that a relative movement between the separator and the bottom of the casing may take place. With this purpose in view the separator is preferably movable vertically within the casing so that it may be raised to free the eggs. In this instance, the separator is supported by a plurality of pivoted supports 22 preferably of L-shaped construction and each having one end thereof turned laterally at 23 and journaled in one of the rolls 8 at the sides of the bottom wall of the casing. The other end of the L-shaped member 22 may be turned laterally at 24 and be journaled in a sleeve 25 which is slidably mounted on the separator frame 17. When the separator is in its lowermost position, one arm of the L-shaped support 22 rests upon the bottom of the casing while the other arm extends vertically therefrom, thus providing a rigid support for the separator. In its lowermost position, the outwardly-turned portion 24 springs into a pocket or depression 26 on the inner face of the adjacent wall 3 or 5 and holds the separator frame in its lowermost position against accidental displacement. As the frame is raised, a result which is effected by pulling upwardly on the side bars of the rectangular frame 7 adjacent to the openings 2 when the cover is closed, the projections 24 pass from the pockets 26 and frictionally engage the side walls 3 and 5 so as to hold the separator in its raised position.

In order that the tray 21 may cushion the lower ends of the eggs, the bottom of the casing may be provided with pockets 27 each of which is directly beneath one of the egg receiving openings of the separator, so that when an egg is in one of the separator openings, its lower end will rest on the bottom of the tray 21 directly over one of said pockets 27 and thus be cushioned. To the end that the depressed portions 14 forming the pockets 27 shall not project below the bottom of the casing, the bottom is pressed upwardly at 28 at least a distance as great as the depressed portions forming the pockets 27. In this way, also, the bottom of the casing, which supports the tray, is above the rolls 8 so that these rolls will not interfere with the withdrawal of the tray. The pockets serve for holding the lower ends of the eggs when the tray or receptacle 21 is removed, permitting the use of the carrier without the tray or receptacle if it should be so desired.

In order further to hold the eggs away from each other, means may be provided on the cover for coöperating with the uppermost ends of the eggs. In this embodiment, the cover is depressed at 29 and this depressed portion is pressed upwardly at 30 to form pockets each directly above one of the openings in the separator. These pockets are further provided with crossing slots 31 which form resilient tongues 32 to protect the eggs should the latter contact with said tongues. There may also be arranged on the cover a drum 33 formed from card board and having openings 34 which receive the upper ends of the eggs, these openings 34 registering with the pockets formed by pressed-up portions 30 and being smaller in diameter than said pockets. The drum 33 may be held to the cover by striking up from the metal of the cover, lips 35 which may be arranged at two opposite sides of the drum and be turned inwardly, permitting the drum to be withdrawn in its plane from engagement by the lips for the purpose of renewing said drum when it becomes worn out.

A locking device for the cover may embody a sliding bolt 36 arranged on the upper surface of the depressed portion 29 and adapted to be projected through an opening 37 in a side wall of the depressed portion, in order that its free end may engage below the roll 6 along the upper edge of the front wall 3.

Instead of making the top of one piece of sheet metal, the top may be provided with a yielding portion which coöperates with the uppermost ends of the eggs. This may be effected by providing a rectangular frame portion 38 having flanges 29ª depressed from the metal at the inner edge of the frame, said flanges being turned inwardly at 39 at their lower edges to provide shoulders on which the yielding cover portion 40 is supported. This cover portion 40 may be resiliently pressed against the flanges 39 by springs 41 which are in the form of flat curved strips of metal pivoted at 42 to the upper face of the yielding portion 40 and having their ends adapted to enter openings 43 in the depressed flanges 29ª, so that the yielding portion 40 is held within the rectangular frame 38 but is adapted to yield slightly in said frame to accommodate itself to the eggs. The yielding portion may have the upwardly-pressed pockets 30 slotted at 31 to provide the yielding tongues 32 as in the embodiment shown in Fig. 1. A drum 33 may be positioned over the yielding portion to perform the functions of the like drum in the embodiment shown in Figs. 1 to 8. The drum is held to the cover in a different manner from that illustrated in the aforesaid figures, being located between the inwardly-turned flanges 39 and the yielding portion 40. The other portions of the carrier casing of the embodiment shown in Figs. 10 and 11 are the same as in the first described embodiment.

There has been illustrated in connection with Fig. 11, a form of tray different from that shown in the embodiment illustrated in Figs. 1 to 9 and this tray is shown in plan in Fig. 13 of the drawing. It differs from the other tray in having depressed portions or pockets 44 in the bottom thereof, said pockets corresponding in number to the divisions in the separator and being located in such positions that, when the receptacle 21 is located within the carrier box, the tray pockets will receive the lowermost ends of the eggs and hold the latter against shifting at their lower ends. This pocketed tray or receptacle together with the pocketed cover holds the eggs in upright position away from the separating wires of the separator. The lower ends of the eggs are cushioned as the depressed portions of the tray, while projecting into the pockets 27 in the bottom of the carrier case, are spaced from the walls of the latter. The upper ends of the eggs are also cushioned as they rest within openings of a card board drum over pockets in the cover, and in addition this drum is yieldingly supported and adapts itself to eggs of different sizes.

In the use of the device, assuming that the same is to be used for carrying and delivering eggs, a tray 21 or 21ª is introduced through one of the openings in the side walls of the casing, beneath the separator so as to rest upon the bottom of the casing, the separator being in its lowermost position and the cover being opened, permitting the eggs to be deposited in the openings of the separator with their lower ends resting upon the bottom of the tray 21 directly over the pockets 27. The cover is then closed, causing the upper ends of the eggs to be engaged by the drum 33 which tends to hold such eggs upright away from the division wires of the separator, the distance between the top of the carrier and the bottom of the tray being such that the eggs are held with a slight pressure between these two parts. When the destination of the eggs is reached, the delivery clerk introduces his fingers through the opposite opened ends of the carrier casing and elevates the separator which permits the eggs to fall sidewise into the tray 21 so that the tray and the eggs may be withdrawn laterally from the casing.

It will be noted that the carrier or box is also adapted to be used independently of the tray 21 as the pockets 27 provide means holding the eggs away from each other at their lowermost ends. The box without the tray is especially adapted for use by house keepers for storing eggs within an ice box as said box is made of sheet metal permitting it to be readily cleaned and is open at its ends so that the temperature of the ice box is communicated directly to the eggs.

What I claim as my invention and desire to secure by Letters Patent is:

1. In an egg carrier, the combination with a casing having pockets in the bottom thereof for receiving the lower ends of eggs, of a separator for holding the eggs separated from each other within the casing with their lower ends resting in the pockets, and a movable cover for the casing having pockets for receiving the upper ends of the eggs and holding said eggs against movement within the casing.

2. In an egg carrier, the combination with a casing having pockets in the bottom thereof for receiving the lower ends of eggs, of a separator for holding the eggs separated from each other within the casing with their lower ends in the pockets, and a movable cover carrying a yieldingly supported drum of card board having openings for receiving the upper ends of the eggs and holding said eggs against movement within the casing.

3. An egg carrier comprising a casing, a separator therein, a cover having sheet metal portion formed with upwardly pressed portions providing pockets and a drum formed of cardboard and secured to the cover, said drum having openings coincident with the pockets in the cover for receiving the upper ends of eggs within the casing.

4. An egg carrier comprising a casing having an intake opening at its top and a discharge opening in one of its side walls, a receptacle arranged in the casing to support the lower ends of the eggs, and removable with the eggs through the opening in the side wall, and a separator movably arranged within the casing above the receptacle and adapted to hold the eggs in the receptacle in a separated condition.

5. An egg carrier comprising a casing having pockets in the bottom wall thereof, a removable receptacle made of paper board and adapted to be supported on the bottom wall over said pockets, and separating means for holding the eggs separated within the receptacle, the receptacle being removable from said casing with the eggs therein.

6. An egg carrier comprising a casing having openings in opposite side walls thereof, and a separator adapted to be raised and lowered in the casing, and, when in its lowermost position, spaced from the bottom of the casing to permit a receptacle to be located below the separator for holding the eggs, said receptacle and eggs being removable through either of the openings in the side walls, and the separator having portions lying in proximity to the openings and adapted to be manipulated for raising and lowering the separator.

7. An egg carrier comprising a casing having an opening in one of its side vertical walls, a separator movable vertically in the casing, and supports for such separator each pivotally mounted at one end and slidably mounted at the other end, said supports holding the separator in spaced relation to the bottom wall of the casing to permit a receptacle to be arranged below the said separator and permitting the vertical movement of the separator in order that the receptacle with the eggs therein may be removed through the opening in the vertical side walls.

8. An egg carrier comprising a casing having an opening in one of its vertical side walls, a separator vertically movable within the casing, and supports for the separator pivotally mounted at their lower ends and having their upper ends slidably connected with the separator.

9. An egg carrier comprising a casing having a delivery opening in one of its vertical side walls, a vertically movable separator arranged within the casing, and L-shaped supports for the separator, each having one arm pivoted to the casing at one end and adapted to rest upon the bottom of the casing, when in lowermost position, to support the separator in spaced relation to the bottom of the casing the other arm of said support being slidably connected with the separator to permit the latter to be raised and lowered relatively to the bottom of the casing.

10. An egg carrier comprising a casing having a delivery opening in one of its vertical side walls, a vertically movable separator arranged within the casing, supports for the separator each having one end pivoted to the casing, and sleeves to each at which the other end of one of said supports is pivoted, said sleeves being slidably mounted on the separator to permit the separator to be raised and lowered relatively to the bottom of the casing in order that a tray with eggs therein may be removed from the bottom of the casing through the opening in the vertical side wall.

11. An egg carrier comprising a casing, having a delivery opening in one of its vertical side walls, a vertically movable separator arranged within the casing, L-shaped supports for the separator, each having one arm pivoted to the casing at one end and adapted to rest upon the bottom of the casing when in its lowermost position to support the separator in spaced relation to the bottom of the casing, and sleeves slidable on the separator and having the other ends of the L-shaped supports pivotally connected thereto to permit the separator to be raised and lowered relatively to the bottom of the casing in order that a tray with eggs therein may be removed from the bottom of the casing through the opening in the vertical side wall.

12. An egg carrier comprising a casing formed from a single blank of sheet metal bent between its ends to provide a bottom, a front and a rear wall, the opposite side edges of the bottom wall being rolled, a separator vertically movable in the casing, and supports for the separator having laterally-turned ends pivoted in the rolled side edges of the bottom and said supports also being slidably connected with the separator.

13. An egg carrier comprising a casing having a delivery opening in one of its side walls, a vertically movable separator arranged in the casing, sleeves slidable on said separator, and supports pivoted to the casing and to the sleeve, said supports having portions which interlock with side walls of the casing for holding the separator in its lowermost position.

14. An egg carrier comprising a casing open at opposite ends and formed from a single blank of sheet metal bent between its ends to provide a bottom, a front and a rear wall, the opposite edges of the bottom wall being rolled and the side walls being provided with outwardly-pressed portions, a separator vertically movable in the casing, sleeves slidable on the separator, and L-shaped supports for the separator each having one arm thereof formed of a laterally-turned portion turning in one of the rolled portions of the bottom wall, said arm being adapted to rest upon the bottom of the casing, when the separator is in its lowermost position, and the other arm having a laterally-turned portion at its end pivoted to one of the sliding sleeves and adapted to enter the outwardly-pressed portion in the adjacent wall when the separator is in its lowermost position.

15. An egg carrier comprising a casing open at opposite ends and formed from a single blank of sheet material bent between its ends to provide a front, a bottom and a rear wall, the opposite edges of the bottom wall being rolled upwardly and the bottom wall being pressed upwardly between the rolled edges and depressed downwardly at a plurality of points within the upwardly-pressed portion to provide pockets, and a separator mounted within the casing in spaced relation to the bottom wall to provide a space for a removable receptacle to rest on the upwardly-pressed bottom, said separator being movable upwardly to permit the removal of the receptacle and eggs therein from either end of the casing.

16. An egg carrier comprising a casing having pockets in the bottom thereof, a removable receptacle supported on said bottom over said pockets to support the lower ends of the eggs within the casing, and a movable separator arranged above said receptacle for holding eggs separated within said receptacle and directly over the pockets.

17. An egg carrier comprising a casing having an intake opening for the eggs and a separate discharge opening, a receptacle supporting the eggs at their lower ends within the casing and removable with the eggs through the discharge opening, and separating means attached to the casing for holding the eggs separated from each other within the receptacle.

18. An egg carrier comprising a casing having an intake opening at its top and a discharge opening in one of its vertical sides, a separator arranged within and attached to the casing, and a receptacle arranged below the separator and removable with the eggs therein through the discharge opening independently of the separator, said separator and receptacle being also relatively movable to disengage the separator from the eggs.

19. In an egg carrier, the combination with a casing, and a separator therein, of a cover for the casing embodying a rigid rectangular frame and a yieldingly mounted portion carried by the frame and provided with pockets for receiving the uppermost ends of the eggs within the casing.

20. In an egg carrier, the combination with a casing, and a separator for eggs therein, of a cover for the casing embodying a rectangular frame with depending flanges turned inwardly at their lower edges, and a card-board drum provided with egg receiving openings and supported on the inwardly-turned portions of the flanges.

21. In an egg carrier, the combination with a casing and a separator for eggs therein, of a cover for the casing embodying a rectangular frame with depending flanges turned inwardly at their lower edges, a card board drum provided with egg receiving openings and supported on the inwardly-turned portion of the flange, a sheet metal portion also supported by the flanges above the drum and having upwardly-pressed pockets registering with the openings of the drum, and spring means acting on the sheet metal portion to hold the latter against the drum.

22. The combination with a casing having pockets formed in the bottom thereof, of an egg receiving tray resting on the bottom of the casing and having pockets projecting into the pockets of the casing.

23. The combination with a casing having pockets formed in the bottom thereof, of an egg receiving tray resting on the bottom of the casing and having pockets projecting into the pockets of the casing, and a cover having pockets coöperating with the upper ends of the eggs supported in the pockets of the tray.

PETER J. NAGLE.

Witnesses:
HAROLD H. SIMMS,
ADA M. WHITMORE.